(12) United States Patent
Cho

(10) Patent No.: US 7,861,124 B2
(45) Date of Patent: Dec. 28, 2010

(54) METHOD AND APPARATUS FOR PERFORMING EXTERNAL DEVICE'S DIAGNOSTIC FUNCTIONS IN HOST COMPUTER

(75) Inventor: Jae-kyung Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 724 days.

(21) Appl. No.: 11/214,902

(22) Filed: Aug. 31, 2005

(65) Prior Publication Data
US 2006/0143546 A1 Jun. 29, 2006

(30) Foreign Application Priority Data
Dec. 15, 2004 (KR) .................. 10-2004-0106539

(51) Int. Cl.
G06F 11/00 (2006.01)
(52) U.S. Cl. .................................. 714/44
(58) Field of Classification Search .......... 714/44
See application file for complete search history.

(56) References Cited

U.S. PATENT DOCUMENTS

| | | | | |
|---|---|---|---|---|
| 5,959,539 | A * | 9/1999 | Adolph et al. | 340/3.5 |
| 6,473,788 | B1 * | 10/2002 | Kim et al. | 709/209 |
| 6,516,427 | B1 * | 2/2003 | Keyes et al. | 714/25 |
| 6,697,969 | B1 * | 2/2004 | Merriam | 714/46 |
| 6,745,151 | B2 * | 6/2004 | Marko et al. | 702/182 |
| 6,782,495 | B2 * | 8/2004 | Bernklau-Halvor | 714/44 |
| 6,813,733 | B1 * | 11/2004 | Li et al. | 714/47 |
| 6,816,760 | B1 * | 11/2004 | Namaky | 701/29 |
| 6,983,200 | B2 * | 1/2006 | Bodin et al. | 701/33 |
| 7,093,169 | B2 * | 8/2006 | Merriam | 714/47 |
| 7,231,549 | B1 * | 6/2007 | Rhea et al. | 714/25 |
| 7,243,270 | B2 * | 7/2007 | Taniguchi et al. | 714/44 |
| 7,305,289 | B2 * | 12/2007 | Gessner et al. | 701/33 |
| 7,308,492 | B2 * | 12/2007 | Konopka et al. | 709/221 |
| 7,729,879 | B2 * | 6/2010 | Haggar et al. | 702/122 |
| 2002/0165924 | A1 * | 11/2002 | Kim et al. | 709/209 |
| 2004/0064762 | A1 * | 4/2004 | Deshpande et al. | 714/44 |
| 2004/0165210 | A1 * | 8/2004 | Jamison et al. | 358/1.15 |
| 2005/0015813 | A1 * | 1/2005 | Yun | 725/131 |
| 2005/0050182 | A1 * | 3/2005 | Neville et al. | 709/223 |
| 2005/0144507 | A1 * | 6/2005 | Lee et al. | 714/4 |
| 2007/0277057 | A1 * | 11/2007 | Braun | 714/44 |
| 2009/0182533 | A1 * | 7/2009 | Neuenschwander et al. | 702/185 |

FOREIGN PATENT DOCUMENTS

| | | |
|---|---|---|
| CN | 1159686 | 9/1997 |
| CN | 1522086 | 8/2004 |
| JP | 02-202161 | 8/1990 |

(Continued)

Primary Examiner—Robert Beausoliel
Assistant Examiner—Amine Riad
(74) Attorney, Agent, or Firm—Roylance, Abrams, Berdo & Goodman, L.L.P.

(57) ABSTRACT

Provided are a method and apparatus for performing diagnostic functions of an external device such as a printer, connected to a host computer. The apparatus and method receive information about diagnostic functions supported by the external device from the external device; receive one or more of the diagnostic functions which are selected by a user; request the external device to perform the selected diagnostic functions; and receive the results of the requested diagnostic functions from the external device.

19 Claims, 3 Drawing Sheets

FOREIGN PATENT DOCUMENTS

| | | |
|---|---|---|
| JP | 08-293947 | 11/1996 |
| JP | 2002-011928 | 1/2002 |
| JP | 2002-014795 | 1/2002 |
| KR | 10-1997-0057880 | 6/1999 |
| KR | 10-1998-0019918 | 12/1999 |
| KR | 10-2003-0028584 | 4/2003 |

* cited by examiner

FIG. 2

| DIAGNOSTIC FUNCTION NUMBER | DIAGNOSTIC OBJECT | EXPLANATION OF FUNCTION | DEVICE IDENTIFICATION NUMBER | STATUS BEFORE DIAGNOSIS | CAPABILITY OF PERFORMING FUNCTION |
|---|---|---|---|---|---|
| 1 | FAX MODEM | MODEM SPEED DIAGNOSIS | 0x0208 | NORMAL | IMPOSSIBLE |
| 2 | TONER | DIAGNOSIS OF REMAINED CAPACITY | 0x0302 | SHORT OF TONER | POSSIBLE |

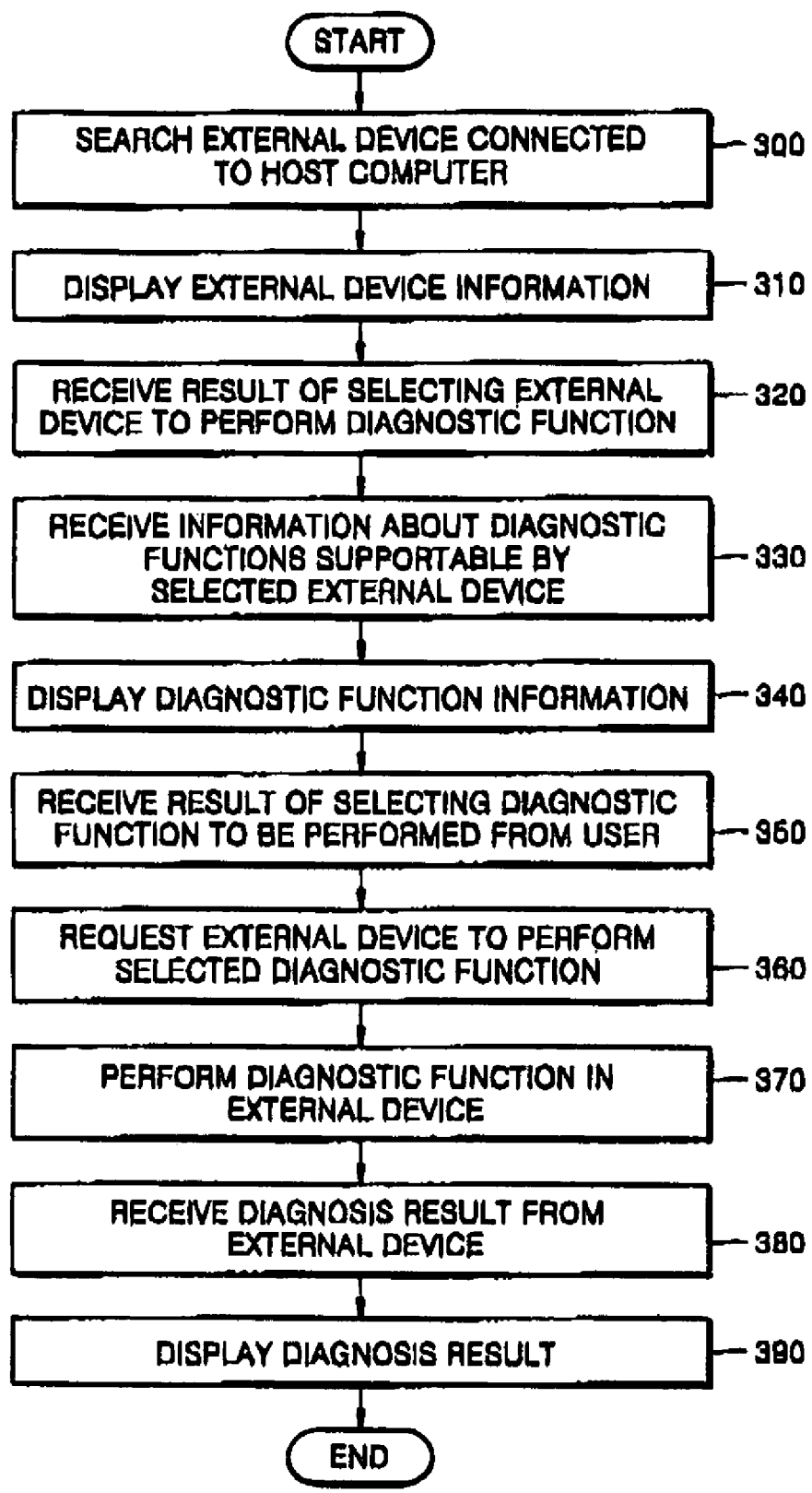

METHOD AND APPARATUS FOR PERFORMING EXTERNAL DEVICE'S DIAGNOSTIC FUNCTIONS IN HOST COMPUTER

CROSS REFERENCE TO RELATED APPLICATIONS

This application claims the benefit under 35 U.S.C. §119 (a) of Korean Patent Application No. 10-2004-0106539, filed on Dec. 15, 2004, in the Korean Intellectual Property Office, the entire disclosure of which is hereby incorporated by reference.

BACKGROUND OF THE INVENTION

1. Field of the Invention

The present invention relates to a method and apparatus for performing diagnostic functions of an external device like a printer connected to a host computer. More particularly, the present invention relates to a method and apparatus for performing diagnostic functions of an external device in a host computer, in which information about diagnostic functions supported by the external device which is connected to the host computer is automatically transmitted to the host computer, and diagnostic functions chosen by a user are performed in the host computer.

2. Description of the Related Art

In general, peripheral devices such as printers, scanners, faxes, multifunctional devices, digital cameras, and the like, which can be connected to a host computer have diagnostic functions provided by the device vendor. In the case of a multifunctional device, the diagnostic functions allow for diagnosing the status of a multifunctioning device, such as whether the memory operates normally, the amount of toner remaining, whether the mechanical components operate normally, detecting firmware installation information, or the like, which is related to the normal operation of the device. Accordingly, when a problem occurs in an external device, a user performs diagnostic functions directly in the external device, or in a host computer to which the external device is connected. Alternatively, the user may set in advance the diagnostic functions to be automatically performed at fixed intervals during the normal operation of the external device. When the diagnosis finds a problem, the result is displayed on the external device or host computer so that the user can view the result, or transmitted to the vendor of the external device.

However, in order to perform diagnostic functions of an external device connected to a host computer using the conventional method, information about all the available diagnostic functions of every possible external device must be previously stored in the host computer. Therefore, when new diagnostic functions are added to the external device or a new external device is connected to the host computer, information about the added diagnostic functions must disadvantageously be specially stored in the host computer through an additional procedure before the added diagnostic functions can be performed.

SUMMARY OF THE INVENTION

Embodiments of the present invention provide a method and apparatus for performing diagnostic functions of an external device in a host computer, in which information about diagnostic functions supported by the external device which is connected to the host computer is automatically transmitted to the host computer, and diagnostic functions chosen by a user are performed in the host computer.

According to an aspect of the present invention, there is provided a method of performing diagnostic functions of an external device in a host computer, the method comprising the steps of receiving information about diagnostic functions supported by the external device from the external device; receiving one or more of the diagnostic functions which is selected by a user; requesting the external device to perform the selected diagnostic functions; and receiving the diagnosis result from the external device.

The information about the diagnostic functions may include at least one of diagnostic objects of the diagnostic function, an explanation of the diagnostic function, an identification number of the external device, and the status of the external device before diagnosis.

The method may further include displaying the received supported diagnostic functions or displaying the received diagnosis result.

The method may further include displaying a list of external devices connected to the host computer, and allowing a user to select at least one of the displayed external devices.

The host computer preferably uses the simple network management protocol (SNMP) to receive the supported diagnostic functions and the diagnosis result from the external device, and request the external device to perform the diagnostic functions.

According to another aspect of the present invention, there is provided an apparatus for performing diagnostic functions, the apparatus being included in an external device connected to a host computer. The apparatus comprises a memory which stores information about diagnostic functions supported by the external device; a diagnosis processing unit which receives information about the diagnostic functions from the memory and performs a diagnostic function requested by the host computer using the information; and a data input/output unit which receives the information about the diagnostic functions from the diagnosis processing unit, outputs the information to the host computer, receives the diagnostic functions requested by the host computer, and outputs the results of the requested diagnostic functions to the host computer.

The information about the diagnostic functions preferably includes at least one of the name of a diagnostic function, a diagnostic object, an explanation of a diagnostic function, an identification number of an external device, and the status of the external device before diagnosis.

The data input/output unit preferably transmits and receives data to and from the host computer using SNMP.

According to still another aspect of the present invention, there is provided a diagnostic system for performing diagnostic functions of an external device by using a host computer. The diagnostic system comprises a host computer which receives supported diagnostic functions from the external device, requests the external device to perform at least one of the diagnostic functions, and receives the result of the selected diagnostic functions from the external device; and an external device which outputs information about supported diagnostic functions to the host computer, and outputs the diagnosis result to the host computer after performing the selected diagnostic functions requested by the host computer.

The method of performing diagnostic functions may be implemented as a computer readable recording medium having embodied thereon a computer program for executing the method.

BRIEF DESCRIPTION OF THE DRAWINGS

The above and other features and advantages of the present invention will become more apparent by describing in detail exemplary embodiments thereof with reference to the attached drawings in which:

FIG. 2 is a table showing exemplary information about diagnostic functions supported by an external device; and FIG. 3 is a flowchart illustrating a method of performing diagnostic functions of an external device by using a host computer, according to an embodiment of the present invention.

Throughout the drawings, like reference numbers will be understood to refer to like features, elements and structures.

DETAILED DESCRIPTION OF EXEMPLARY EMBODIMENTS

Figure 1:
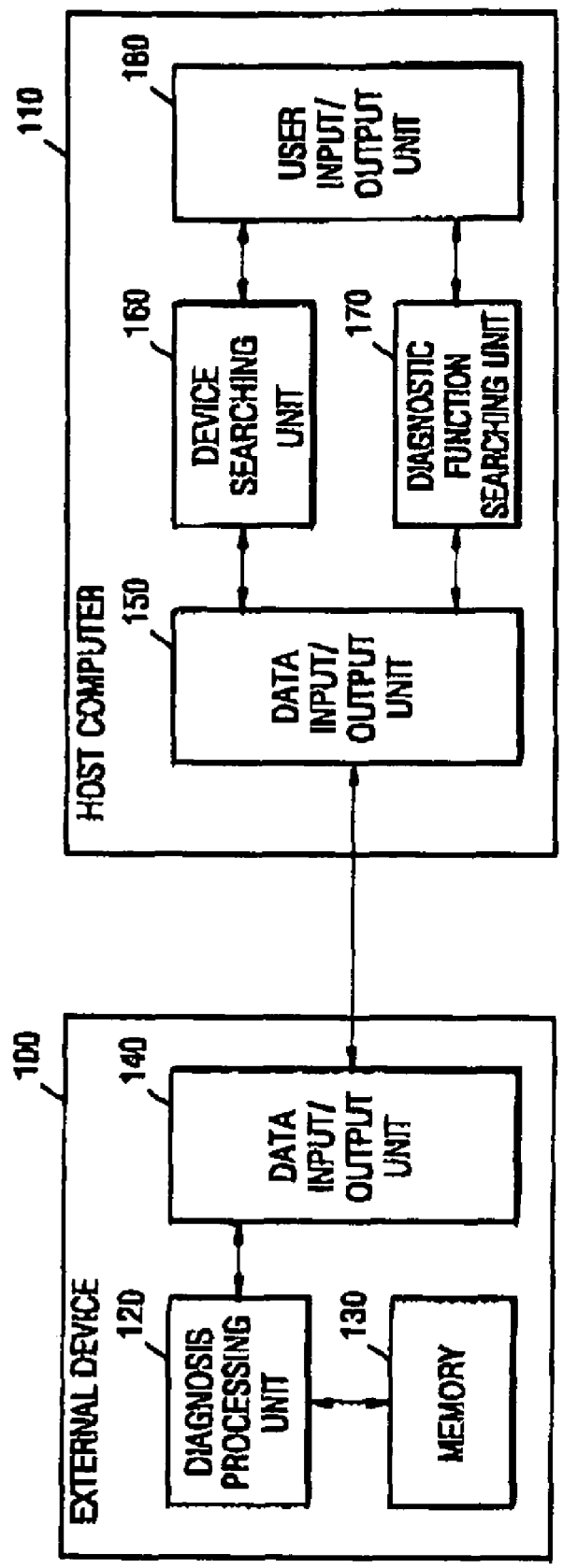
FIG. 1 is a block diagram of a diagnostic system for performing diagnostic functions of an external device by using a host computer, according to an embodiment of the present invention.

Referring to FIGS. 1-3, and exemplary embodiment of the invention will now be described. FIG. 1 is a block diagram of a diagnostic system for performing diagnostic functions of an external device by using a host computer, according to an embodiment of the present invention. The diagnostic system includes an external device 100 and a host computer 110. The operation of the diagnostic system is described in conjunction with a diagnosis method illustrated in the flowchart of FIG. 3. The external device 100 includes a diagnosis processing unit 120, a memory 130, and a data input/output unit 140. The host computer 110 includes a data input/output unit 150, a device searching unit 160, a diagnostic function searching unit 170, and a user input/output unit 180.

The device searching unit 160 receives information through the data input/output unit 150 about the external device 100 connected to the host computer 110 such as, for example, a product name and serial number of the external device 100, and information about whether the external device 100 has a diagnostic function. The device searching unit searches for an external device 100 connected to the host computer 110 (step 300). The external device 100 may be a printer, a multifunctional device, a scanner, a fax, a digital camera, or any other suitable external device for which diagnostic functions have been provided.

The user input/output unit 180 displays information about the found external devices 100 such that a user can view the information (step 310). If more than one external device is found, a user selects a particular external device on which to perform a diagnostic function from the displayed list of external devices, using the user input/output unit 180 (step 320). The user input/output unit 180 preferably includes a liquid crystal display (LCD) panel and a key pad for receiving data from a user, although any other suitable input and output devices could be used.

The diagnostic function searching unit 170 generates a signal for requesting information about diagnostic functions supported by the external device 100 which is selected by the user, and transmits the signal to the external device 100 through the data input/output unit 150. The data input/output unit 140 of the external device 100 receives the signal transmitted from the host computer 110. Further, the diagnosis processing unit 120 reads information about the diagnostic functions supported by the external device 100 from the memory 130, and transmits the information to the host computer 110 through the data input/output unit 140 (step 330).

The diagnostic function searching unit 170 receives the information about the diagnostic functions supported by the external device 100 through the data input/output unit 150, and the user input/output unit 180 displays the diagnostic function information (step 340). The diagnostic function searching unit 170 preferably summarizes the information as needed and displays the information.

The information about the diagnostic functions supported by the external device 100 preferably include a diagnostic object, a brief explanation of the function, an identification number of the external device 100, the status of the external device 100 before diagnosis, and information regarding whether a diagnostic function can be performed.

FIG. 2 is an exemplary table showing information about diagnostic functions for the speed of a fax modem and the toner remaining in a multifunctional device, as an example of information about diagnostic functions supported by an external device.

The user selects a diagnostic function from the displayed list of diagnostioc functions supported by the external device 100 using the input/output unit 180. The input/output unit 180 receives the diagnostic function selected by the user (step 350). The diagnostic function searching unit 170 generates a signal for requesting the external device 100 to perform the selected diagnostic function, and transmits the signal to the external device 100 through the data input/output unit 150 (step 360).

The diagnosis processing unit 120 receives the signal for requesting the performance of the diagnostic function through the data input/output unit 140 of the external device 100, and performs the requested diagnostic function using the information about the supported diagnostic function stored in the memory 130 (step 370). The diagnosis processing unit 120 can be connected to a toner cartridge (not shown), a driving system (not shown), a sensor (not shown), a modem (not shown), or any other suitable diagnostic object.

The diagnosis processing unit 120 transmits the diagnosis result obtained in step 370 to the host computer 110 through the data input/output unit 140 of the external device 100 (step 380). The diagnostic function searching unit 170 receives the diagnosis result through the data input/output unit 150, and the user input/output unit 180 displays the diagnosis result (step 390).

It is preferable to use the single network management protocol (SNMP) for transmitting and receiving data between the data input/output unit 140 of the external device 100 and the data input/output unit 150 of the host computer 110.

SNMP, which is most widely used for network management, works by transmitting and receiving specific information between an SNMP manager and a network device. In the diagnostic system according to an embodiment of the present invention, it is preferable that the data input/output unit 150 of the host computer 110 becomes the SNMP manager, and the input/output unit 140 of the external device 100 becomes an SNMP agent, so that the input/output units 150 and 140 can transmit and receive data with each other.

The invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

As described above, by using an apparatus and method of performing a diagnostic function of an external device in a host computer, according to an embodiment of the present invention, information about the diagnostic function of each external device does not have to be previously stored in the host computer, and when new diagnostic functions are added, no additional procedure needs to be performed. Therefore, compatibility for performing the diagnostic functions in the host computer can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing diagnostic functions of an external device in a host computer, the method comprising:
   locating an external device and requesting information from the external device about diagnostic functions supported by the external device;
   receiving from the external device, the requested information about diagnostic functions supported by the external device;
   receiving a selection from a user for one or more of the diagnostic functions contained in the requested information to be performed at the external device;
   requesting the external device to perform the selected diagnostic functions; and
   receiving the results of the requested diagnostic functions from the external device.

2. The method of claim 1, wherein the information about the diagnostic functions includes at least one of diagnostic objects of the diagnostic function, an explanation of the diagnostic function, an identification number of the external device, and the status of the external device before diagnosis.

3. The method of claim 1, further comprising:
   displaying the received supported diagnostic functions.

4. The method of claim 1, further comprising:
   displaying the received diagnosis result.

5. The method of claim 1, further comprising:
   displaying a list of external devices connected to the host computer, and allowing a user to select at least one of the displayed external devices.

6. The method of claim 1, wherein the host computer uses the simple network management protocol (SNMP) to receive the supported diagnostic functions and the diagnosis result from the external device, and request the external device to perform the diagnostic functions.

7. An apparatus for performing diagnostic functions, the apparatus being included in an external device connected to a host computer and comprising:
   a memory which stores information about diagnostic functions supported by the external device;
   a diagnosis processing unit which receives requested information about the diagnostic functions from the memory and performs a diagnostic function requested by the host computer using the requested information; and
   a data input/output unit which receives the requested information about the diagnostic functions from the diagnosis processing unit, outputs the information to the host computer, receives requests from the host computer to perform diagnostic functions contained in the information, and outputs the results of the requested diagnostic functions to the host computer.

8. The apparatus of claim 7, wherein the information about the diagnostic functions includes at least one of the name of a diagnostic function, a diagnostic object, an explanation of a diagnostic function, an identification number of an external device, and the status of the external device before diagnosis.

9. The apparatus of claim 7, wherein the data input/output unit transmits and receives data to and from the host computer using SNMP.

10. A diagnostic system for performing diagnostic functions of an external device by using a host computer, the diagnostic system comprising:
    a host computer which receives requested information about supported diagnostic functions from the external device, requests the external device to perform at least one of the diagnostic functions contained in the requested information, and receives a result of an execution of the selected diagnostic functions from the external device; and
    an external device which outputs requested information about supported diagnostic functions to the host computer, and outputs the diagnosis result to the host computer after performing the selected diagnostic functions requested by the host computer.

11. The diagnostic system of claim 10, wherein the information about supported diagnostic functions includes at least one of diagnostic objects of the diagnostic function, an explanation of the diagnostic function, an identification number of the external device, and the status of the external device before diagnosis.

12. The diagnostic system of claim 10, wherein the host computer further displays the received supported diagnostic functions.

13. The diagnostic system of claim 10, wherein the host computer further displays the received diagnosis result.

14. The diagnosis system of claim 10, wherein the host computer displays a list of external devices connected to the host computer, and receives a selection result from a user selecting at least one of the displayed external devices.

15. The diagnosis system of claim 10, wherein the host computer uses the simple network management protocol (SNMP) to receive the supported diagnostic functions and the diagnosis result from the external device, and to request the external device to perform the diagnostic functions.

16. A computer readable medium of instructions for controlling a diagnosis system comprising a host computer and at least one external device connected to the host computer, comprising:
    a first set of instructions adapted to control the host computer to receive requested information about diagnostic functions supported by the at least one external device from the external device;
    a second set of instructions adapted to control the host computer to receive a selection from a user of one or more of the diagnostic functions contained in the requested information to be performed by the external device;
    a third set of instructions adapted to control the host computer to request the external device to perform the selected diagnostic functions; and
    a fourth set of instructions adapted to control the host computer to receive the results of the requested diagnostic functions from the external device.

17. The computer readable medium of instructions of claim 16, further comprising:

a fifth set of instructions adapted to control the host computer to display the received supported diagnostic functions.

18. The computer readable medium of instructions of claim 16, further comprising:
a sixth set of instructions adapted to control the host computer to display the received diagnostic result.

19. The computer readable medium of instructions of claim 16, further comprising:
a seventh set of instructions adapted to control the host computer to display a list of external devices connected to the host computer, and to receive a selection of at least one of the displayed external devices from a user.

* * * * *